United States Patent
Bose et al.

(10) Patent No.: US 8,156,287 B2
(45) Date of Patent: Apr. 10, 2012

(54) ADAPTIVE DATA PREFETCH

(75) Inventors: Pradip Bose, Yorktown Heights, NY (US); Alper Buyuktosunoglu, White Plains, NY (US); Miles Robert Dooley, Austin, TX (US); Michael Stephen Floyd, Cedar Park, TX (US); David Scott Ray, Georgetown, TX (US); Bruce Joseph Ronchetti, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 597 days.

(21) Appl. No.: 12/354,219

(22) Filed: Jan. 15, 2009

(65) Prior Publication Data

US 2010/0180081 A1    Jul. 15, 2010

(51) Int. Cl.
*G06F 13/00* (2006.01)
*G06F 1/00* (2006.01)

(52) U.S. Cl. ............... 711/137; 711/154; 711/E12.057; 713/300

(58) Field of Classification Search ............... 711/137, 711/154, E12.057; 713/300
See application file for complete search history.

(56) References Cited

U.S. PATENT DOCUMENTS

| | | | |
|---|---|---|---|
| 5,758,119 A * | 5/1998 | Mayfield et al. ............... 711/122 |
| 6,449,698 B1 | 9/2002 | Deshpande et al. | |
| 6,523,150 B1 | 2/2003 | Buffet et al. | |
| 6,658,447 B2 | 12/2003 | Cota-Robles | |
| 6,665,843 B2 | 12/2003 | Frech et al. | |
| 6,883,152 B2 | 4/2005 | Bednar et al. | |
| 6,976,235 B2 | 12/2005 | Bobba et al. | |
| 6,990,645 B2 | 1/2006 | Lichtensteiger et al. | |
| 7,149,867 B2 | 12/2006 | Poznanovic | |
| 7,437,438 B2 * | 10/2008 | Mogul et al. .................. 709/223 |
| 2004/0073822 A1 | 4/2004 | Greco et al. | |
| 2005/0149936 A1 | 7/2005 | Pilkington | |
| 2006/0095806 A1 | 5/2006 | Dai et al. | |
| 2006/0236136 A1 | 10/2006 | Jones | |
| 2007/0113053 A1 | 5/2007 | Jensen et al. | |
| 2007/0138653 A1 | 6/2007 | Bartley et al. | |
| 2007/0283101 A1 | 12/2007 | El-Essawy et al. | |

OTHER PUBLICATIONS

Cazorla et al., "DCache Wam: an I-Fetch Policy to Increase SMT Efficiency", IEEE Computer Society, Proc. of 18th Intl Parallel and Distibuted Processing Symposium, 2004.
Cazorla et al., "QoS For High-Performance SMT Processors in Embedded Systems", IEEE Computer Society, 2004, pp. 24-31.

* cited by examiner

*Primary Examiner* — Edward Dudek, Jr.
(74) *Attorney, Agent, or Firm* — Francis Lammes; Stephen J. Walder, Jr.; Diana R. Gerhardt (57) ABSTRACT

A data processing system includes a processor, a unit that includes a multi-level cache, a prefetch system and a memory. The data processing system can operate in a first mode and a second mode. The prefetch system can change behavior in response to a desired power consumption policy set by an external agent or automatically via hardware based on on-chip power/performance thresholds.

16 Claims, 6 Drawing Sheets

ADAPTIVE DATA PREFETCH

This invention was made with United States Government support under Agreement No. HR0011-07-9-0002 awarded by DARPA. The Government has certain rights in the invention.

BACKGROUND

A special very high-speed memory is sometimes used to increase the speed of processing within a data processing system by making current programs and data available to a processor at a rapid rate. Such a high-speed memory is known as a cache and is sometimes employed in large computer systems to compensate for the speed differential between main memory access time and processor logic. Processor logic is usually faster than main memory access time with a result that processing speed is mostly limited by the speed of main memory. A technique used to compensate for the mismatch in operating speeds is to employ one or more extremely fast, small memory arrays between the CPU and main memory, whose access time is close to processor logic propagation delays. It is used to store segments of programs currently being executed in the CPU and temporary data frequently needed in the present calculations. By making programs (instructions) and data available at a rapid rate, it is possible to increase the performance rate of the processor.

Analysis of a large number of programs has shown that the references to memory at any given interval of time tend to be confined within a few localized areas in memory. This phenomenon is known as the property of "locality of reference." The reason for this property may be understood considering that a typical computer program flows in a straight-line fashion with program loops and subroutine calls encountered frequently. When a program loop is executed, the CPU repeatedly refers to the set of instructions in memory that constitute the loop. Every time a given subroutine is called, its set of instructions are fetched from memory. Thus, loops and subroutines tend to localize the reference to memory for fetching instructions. To a lesser degree, memory references to data also tend to be localized. Table look-up procedures repeatedly refer to that portion in memory where the table is stored. Iterative procedures refer to common memory locations and arrays of numbers are confined within a local portion of memory. The result of all these observations is the locality of reference property, which states that, over a short interval of time, the addresses of instructions generated by a typical program refer to a few localized areas of memory repeatedly while the remainder of memory is accessed relatively infrequently.

If the active portions of the program and data are placed in a fast small memory such as a cache, the average memory access time can be reduced, thus reducing the total execution time of the program. The cache memory access time is less than the access time of main memory often by a factor of five to ten. The cache is the fastest component in the memory hierarchy and approaches the speed of CPU components.

The fundamental idea of cache organization is that by keeping the most frequently accessed instructions and data in one or more fast cache memory arrays, the average memory access time will approach the access time of the cache. Although the cache is only a small fraction of the size of main memory, a large fraction of memory requests will be found in the fast cache memory because of the locality of reference property of programs.

The basic operation of the cache is as follows. When the CPU needs to access memory, the cache is examined. If the word is found in the cache, it is read from the fast memory. If the word addressed by the CPU is not found in the cache, the main memory is accessed to read the word. A block of words containing the one just accessed is then transferred from main memory to cache memory. In this manner, some data is transferred to cache so that future references to memory find the required words in the fast cache memory.

The average memory access time of the computer system can be improved considerably by use of a cache. The performance of cache memory is frequently measured in terms of a quantity called "hit ratio." When the CPU refers to memory and finds the word in cache, it is said to produce a "hit." if the word is not found in cache, then it is in main memory and it counts as a "miss." If the hit ratio is high enough so that most of the time the CPU accesses the cache instead of main memory, the average access time is closer to the access time of the fast cache memory. For example, a computer with cache access time of 10 ns, a main memory access time of 300 ns, and a hit ratio of 0.9 produces an average access time of 39 ns. This is a considerable improvement over a similar computer without a cache memory, whose access time is 300 ns.

In modern microprocessors, the processor cycle time continues to improve with technology evolution. Also, design techniques of speculative execution, deeper pipelines, more execution elements and the like continue to improve the performance of the microprocessor. The improved performance puts a heavier burden on the memory interface since the processors demand more data and instructions from memory to feed the microprocessor. Large on-chip caches (L1 or primary caches) are implemented to help reduce the memory latency, and they are often augmented by larger off-chip caches (L2 or secondary caches or even L3 caches).

Prefetching techniques are often implemented to try to supply memory data to the L1 cache ahead of time to reduce latency. Ideally, a program would prefetch data and instructions far enough in advance that a copy of the memory data would always be in the L1 cache when it was needed by the processor.

One of the problems with existing prefetching mechanisms is that they operate on one cache level or one prefetch buffer. With ever increasing memory latencies associated with increasing processor speeds, a prefetch mechanism that operates on multiple cache levels is required. Therefore, what is needed in the art is an improved prefetch mechanism, which alleviates such problems.

SUMMARY

One aspect of the present invention is drawn to a method of operating a data processing system having a processor, a unit that includes a first level cache, a prefetch system, a second level cache, a third level cache and a memory. The unit is operable to store lines of data in the first level cache. The first level cache is operable to store an integer w lines of data. The second level cache is operable to store an integers lines of data. The third level cache is operable to store an integer y lines of data. The memory is operable to store an integer z lines of data. Each of the integer w, x, y and z are greater than zero. The integer x is greater than the integer w. The integer y is greater than the integer x. The integer z is greater than the integer y. The processor is operable to access a line of data in the first level cache within a time $t_1$, to access a line of data in the second level cache within a time $t_2$, to access a line of data in the third level cache within a time $t_3$ and to access a line of data in the memory within a time $t_4$, wherein times $t_1$, $t_2$, $t_3$ and $t_4$ are greater than zero. Further, time $t_1$ is less than time $t_2$, which is less than time $t_3$, which is less than time $t_4$. The prefetch system is operable to retrieve, e.g., copy or move, up to y lines of data from the memory and to store the up to y lines of data in the third level cache. The prefetch system is operable to retrieve up to x lines of data from one of the memory and the third level cache and to store the up to x lines of data in the second level cache. The prefetch system is operable to retrieve up to w lines of data from one of the memory, the third level cache and the second level cache and to store the up to w lines of data in the first level cache.

A data processing system in accordance with an aspect of the present invention includes a processor, a unit that includes a multi-level cache, a prefetch system and a memory. The data processing system can operable in a first mode and a second mode. The prefetch system is operable change behavior in response to a desired power consumption policy set by an external agent or automatically via hardware based on on-chip power/performance thresholds.

In an example embodiment, a method in accordance with the present invention includes running the data processing system in a maximum processing mode, determining whether a high power savings mode is required and running the data processing system in the high power savings mode when the high power savings mode is required.

In another example embodiment, a method in accordance with the present invention further includes determining whether a medium power savings mode is required when the high power savings mode is determined not to be required and running the data processing system in the medium power savings mode when the medium power savings mode is required.

In another example embodiment, a method in accordance with the present invention still further includes determining whether a low power savings mode is required when the medium power savings mode is determined not to be required and running the data processing system in the low power savings mode when the low power savings mode is required.

Additional advantages and novel features of the invention are set forth in part in the description which follows, and in part will become apparent to those skilled in the art upon examination of the following or may be learned by practice of the invention. The advantages of the invention may be realized and attained by means of the instrumentalities and combinations particularly pointed out in the appended claims.

DESCRIPTION OF THE SEVERAL VIEWS OF THE DRAWINGS

The accompanying drawings, which are incorporated in and form a part of the specification, illustrate example embodiments of the present invention and, together with the description, serve to explain the principles of the invention. In the drawings.

DETAILED DESCRIPTION

In the following description, numerous specific details are set forth such as specific word or byte lengths, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted in as much as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

Figure 1:
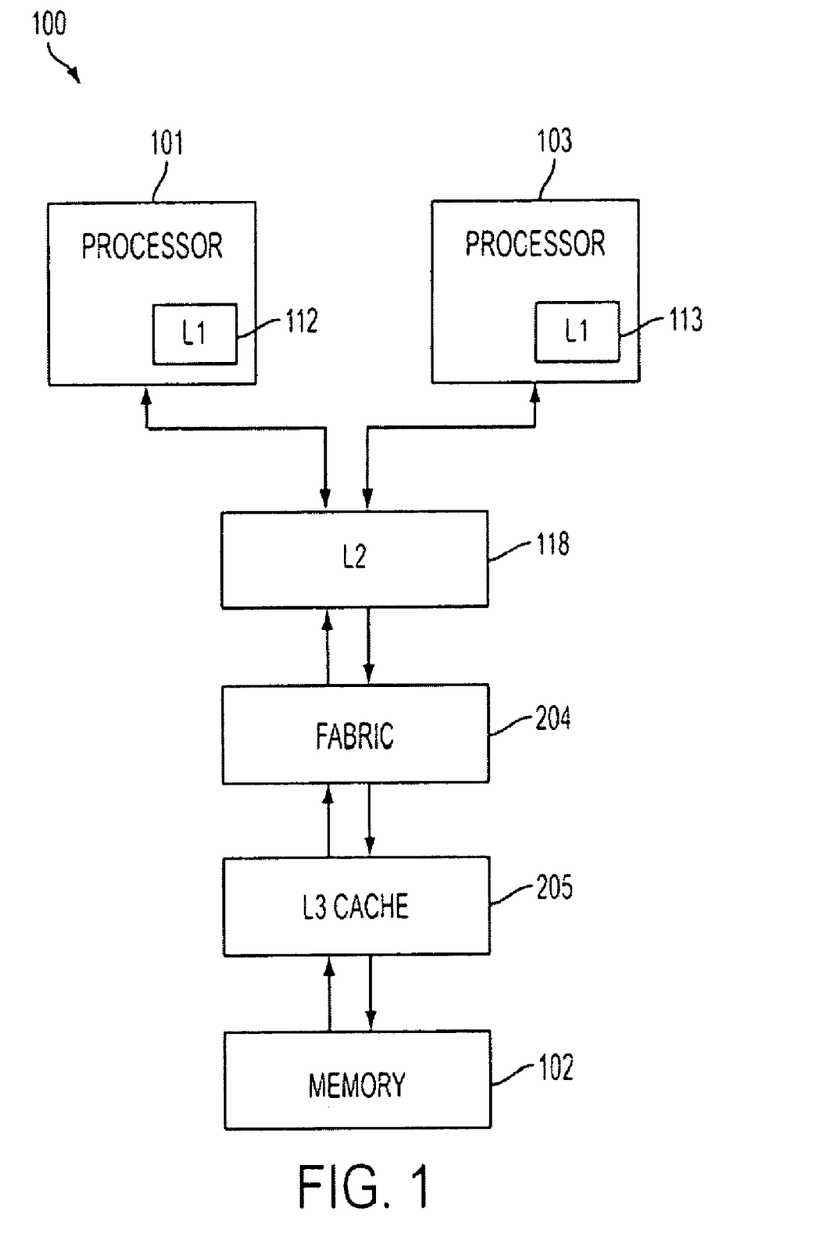
FIG. 1 illustrates a multiprocessor architecture implementing an embodiment of the present invention.

Referring now to FIG. 1, a data processing system which advantageously embodies the present invention will be described. Multiprocessor system 100 includes any number of processing units greater than or equal to one. In the embodiment hereinafter described, processor core 101 having embedded L1 (primary or first level) cache 112 and processor core 103 having embedded L1 cache 113 are both coupled to shared L2 (secondary or second level) cache 118. L2 cache 118 is coupled to fabric 204, which may embody a bus system for enabling other processor cores, or other types of devices typically coupled to a data processing system, which may need instructions and/or data from a central memory system, to be coupled to processor cores 101 and 103. Coupled to fabric 204 is L3 (level three) cache 205, which is then coupled to main memory 102. L3 cache 205 and main memory 102 may be shared by processor cores 101 and 103 with other devices coupled to fabric 204. As a result, system 100 embodies a three-level cache system for alleviating latency problems, as described previously. L3 cache 205 and main memory 102 may be partitioned.

In some embodiments, at least one of processor core 101, processor core 103, L2 cache 118, fabric 204, L3 cache 205 and main memory 102 are separate devices. In other embodiments, processor core 101, processor core 103, L2 cache 118, fabric 204, L3 cache 205 and main memory 102 are a unitary device.

Figure 2:
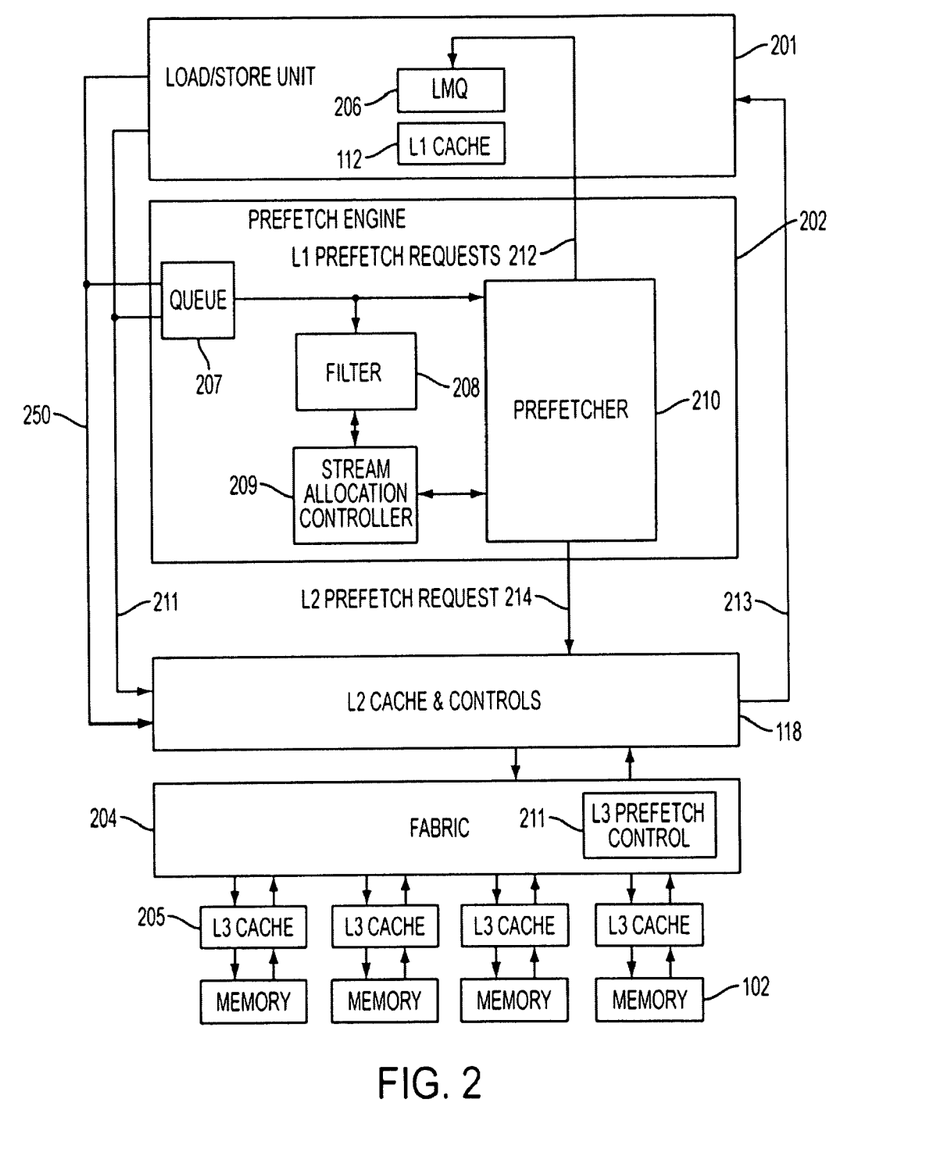
FIG. 2 illustrates further detail of an example hardware prefetch mechanism in accordance with the present invention in block diagram form.

Referring next to FIG. 2, there is illustrated a block diagram detailing the hardware prefetch mechanism that may be used in accordance with an aspect of the present invention. In this illustration, the hardware prefetch mechanism is only described with respect to its implementation within one of processor cores 101 and 103. Load/store unit 201 and prefetch engine 202 will be implemented in both of the processor cores 101 and 103. Load/store unit 201 includes L1 cache 112, along with a load/miss queue (LMQ) 206, which tracks misses to L1 cache 112 upon receiving requests from the processor core 101. However, it should be noted that the present invention is may be implemented with any type of load/store unit implementing a load/miss mechanism for tracking misses to L1 cache 112.

The present invention may be implemented with a dual-ported L1 cache 112. Buses 250 and 211 will handle a set of hits or misses coming out of the load/store unit 201. Such hit or miss signals will be tapped off of buses 250 and 211 into queue 207, which then supplies L1 cache misses to stream filter 208, and L1 cache hit or misses to a prefetcher 210. Buses 250 and 211 are also coupled to L2 cache 118 for fetching cache lines therefrom via bus 213.

Stream filter 208 receives the cache misses and operates in a manner well known in the art. Stream filters are history buffers that contain address and direction information. Stream filter 208 contains the address of a cache line that is the next sequentially higher line from one that missed previously in L1 cache 112. If an access is made to the next higher cache line, a stream condition is detected. For example, stream filter 208 would be written with a cache line address of n+1 if there was an access and miss to cache line n. If a subsequent access is made to cache line address n+1 while n+1 is still resident in stream filter 208, n+1 is then allocated as a stream. Such allocation is performed by stream allocation controller 209 in a manner well known in the art.

An aspect of the present invention may not make use of prefetch buffers, but may instead prefetches cache lines into L1 cache 112, L2 cache 118, and L3 cache 205. Stream filter 208 can allocate and keep track of a multitude of streams. It should be noted that such streams may be allocated in an increasing or decreasing manner as a function of certain rules, as will be discussed in more detail below. When a stream is allocated by the stream allocation controller 209, the prefetcher 210 allocates the head of the stream into the load/miss queue 206. The LMQ 206 then sources the request for the cache line at the head of the stream along buses 250 and 211 as a fetch to L2 cache 118. L2 cache 118 will then "fetch" the cache line to be prefetched into the L1 cache 112 in a well known manner from the L2 cache 118, the L3 cache 205, or main memory 102.

In some embodiments, at least one of load/store unit 201, prefetch engine 202, L2 cache 118, fabric 204, L3 cache 205 and main memory 102 are separate devices. In other embodiments, load/store unit 201, prefetch engine 202, L2 cache 118, fabric 204, L3 cache 205 and main memory 102 are a unitary device.

In some embodiments, LMQ 206 and L1 cache 112 are separate devices. In other embodiments, LMQ 206 and L1 cache 112 are a unitary device.

In some embodiments, at least one of queue 207, stream filter 208, stream allocation controller 209 and prefetcher 210 are separate devices. In other embodiments, queue 207, stream filter 208, stream allocation controller 209 and prefetcher 210 are a unitary device.

Figure 3:
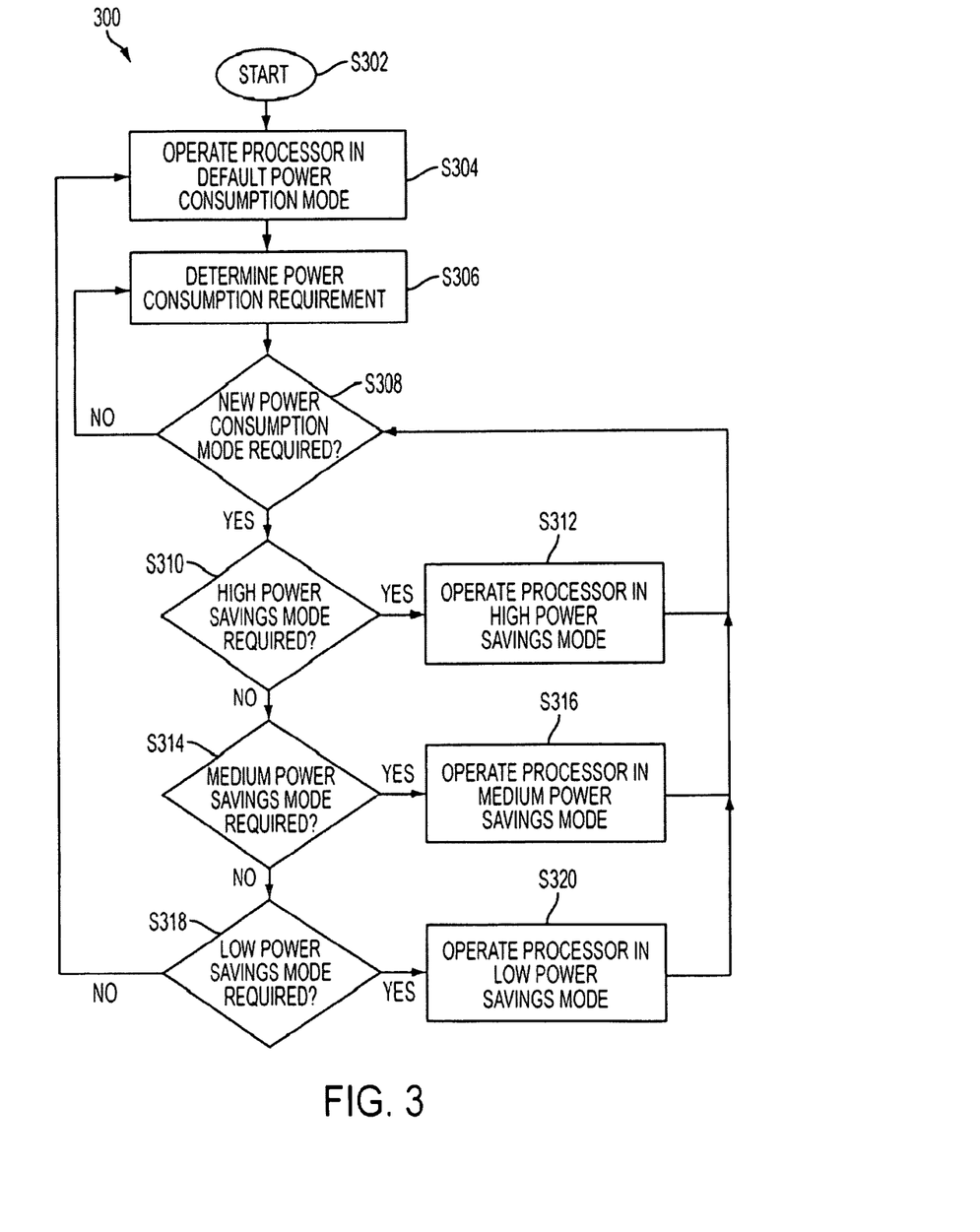
FIG. 3 is a logic flow diagram describing an exemplary method of operation of a data processing system having an adaptive data prefetch for power efficiency in accordance with an aspect of the present invention.
Figure 4:
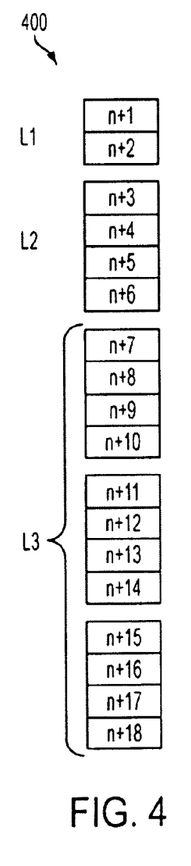
FIG. 4 illustrates an example first state of an L1 cache, an L2 cache and an L3 cache in an example default power consumption mode in accordance with an aspect of the present invention.
Figure 5:
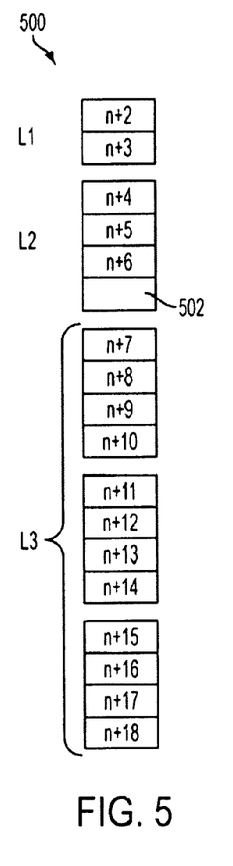
FIG. 5 illustrates an example second state of an L1 cache, an L2 cache and an L3 cache in an example default power consumption mode in accordance with an aspect of the present invention.
Figure 6:
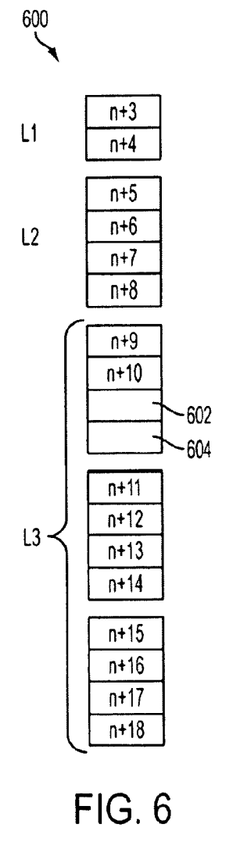
FIG. 6 illustrates an example third state of an L1 cache, an L2 cache and an L3 cache in an example default power consumption mode in accordance with an aspect of the present invention.
Figure 7:
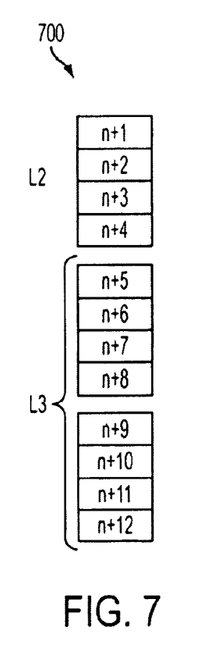
FIG. 7 illustrates an example first state of an L2 cache and an L3 cache in an example medium power savings mode in accordance with an aspect of the present invention.
Figure 8:
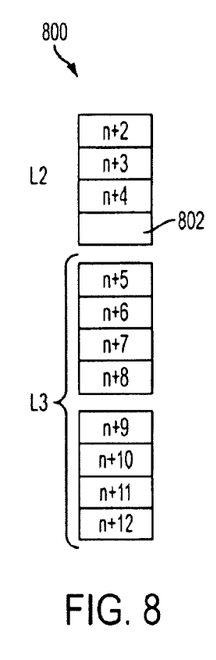
FIG. 8 illustrates an example second state of an L2 cache and an L3 cache in an example medium power savings mode in accordance with an aspect of the present invention.
Figure 9:
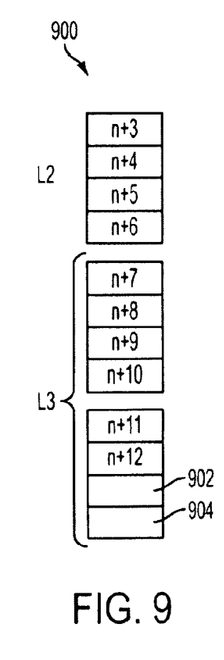
FIG. 9 illustrates an example third state of an L2 cache and an L3 cache in an example medium power savings mode in accordance with an aspect of the present invention.
Figure 10:
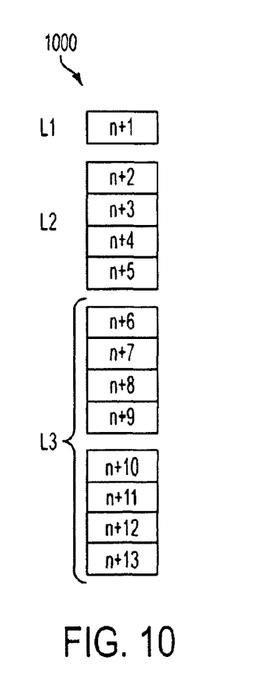
FIG. 10 illustrates an example first state of an L1 cache, an L2 cache and an L3 cache in an example low power savings mode in accordance with an aspect of the present invention.
Figure 11:
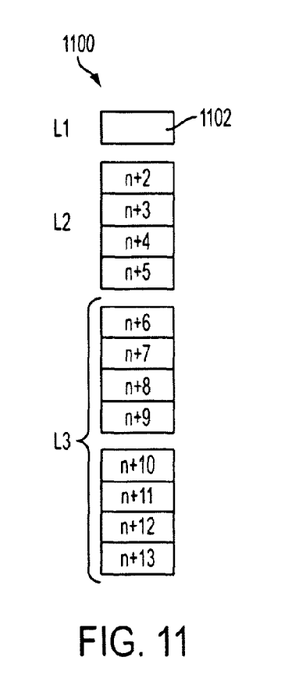
FIG. 11 illustrates an example second state of an L1 cache, an L2 cache and an L3 cache in an example low power savings mode in accordance with an aspect of the present invention.
Figure 12:
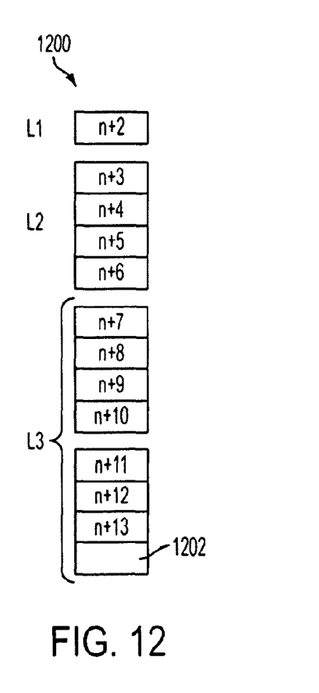
FIG. 12 illustrates an example third state of an L1 cache, an L2 cache and an L3 cache in an example low power savings mode in accordance with an aspect of the present invention.

Operation of an example data processing system having an adaptive data prefetch for power efficiency in accordance with an aspect of the present invention will now be described with reference to FIGS. 3-12. FIG. 3 is a logic flow diagram describing an exemplary method of operation of a data processing system having an adaptive data prefetch for power efficiency in accordance with an aspect of the present invention. FIGS. 4-6 illustrate a first state 400, a second state 500 and a third state 600, respectively, of caches L1, L2 and L3 in a maximum processing mode in accordance with an aspect of the present invention. FIGS. 7-9 illustrate a first state 700, a second state 800 and a third state 900, respectively, of caches L2 and L3 in a low medium power savings mode in accordance with an aspect of the present invention. FIGS. 10-12 illustrate a first state 1000, a second state 1100 and a third state 1200 of caches L1, L2 and L3 in a low power savings mode in accordance with an aspect of the present invention.

As illustrated in FIG. 3, process 300 starts (S302) and processor 101 is operating in a default power consumption mode (S304). In multiprocessor system 100 each processor cores 101 and 103 perform all logic steps 300 the same and independently. For simplicity, the subsequent detailed description refers only to processor 101.

The default power consumption mode (S304) is the maximum power consumption mode and concurrently generates the maximum or fastest processing ability to processor 101. When processor 101 is operating in the maximum power consumption mode, maximum prefetching is associated with this mode. A prefetch is a speculative request for data to be brought in from further reaches of memory from processor 101 to closer places in memory, where the processor 101 can access the data more quickly. Hence data prefetching covers up the latency to memory discussed earlier.

Data prefetching occurs well in advance to retrieve lines of data and places these lines in the appropriate level of cache such that when the processor 101 needs the line of data it is available in the closest and thus fastest level cache. Processor 101 continually runs algorithms that recognize when lines of data will be needed triggering prefetching.

Referring to FIG. 1, main memory 102 can store up to z integer lines of data, L3 cache 205 can store up to y integer lines of data, L2 cache 118 can store up to x integer lines of data and L1 cache 112 can store up to w integer lines of data. Main memory 102 is the largest and can store the greatest value lines of data, L3 cache 205 is the second largest and thus can store less lines of data then main memory 102, L2 cache 118 is the third largest and thus can store less lines of data then L3 cache 205, L1 cache 112 is the smallest and thus can store the least lines of data. Therefore the integer w<the integer x<the integer y<the integer z, where each of the integers w, x, y and z are greater than zero.

When accessing levels of memory it takes processor 101 a fixed value of time to retrieve lines of data directly from each. Processor 101 is operable to access lines of data directly from L1 cache 112 in the fastest time $t_1$ because L1 cache 112 is incorporated within processor 101. Processor 101 is operable to access lines of data directly from L2 cache 118 in the second fastest time $t_2$. Processor 101 is operable to access lines of data directly from L3 cache 205 in the third fastest time $t_3$. Processor 101 is operable to access lines of data directly from main memory 102 in the slowest time $t_4$. Access times $t_1$, $t_2$, $t_3$ and $t_4$ are greater than zero, where time $t_1$<time $t_2$<time $t_3$<time $t_4$.

In order to reduce processor latency that is associated with accessing lines of data, groups of lines of data may be moved from higher levels of memory to lower levels of memory prior to a predicted need of such lines of data. This will be described in greater detail below. However, it should be understood that L3 cache 205 can access lines of data from main memory 102 at a time $t_{m3}$, which is shorter than time $t_4$. Further, L2 cache 118 can access lines of data from L3 cache 205 at a time $t_{32}$, which is shorter than time $t_3$. Similarly, L1 cache 112 can access lines of data from L2 cache 118 at a time $t_{21}$, which is shorter than time $t_2$. Therefore, rather than accessing lines of data directly from higher levels of memory, processor 101 may stage memory access from decreasing levels of memory, wherein moving lines of data from one level of memory to a lower level of memory takes less than a direct access.

In one embodiment, processor 101 initiate prefetching to move lines of data up from main memory 102 to L3 cache 205, to move lines of data up from L3 cache 205 to L2 cache 118, and to move lines of data up from L2 cache 118 to L1 cache 112 to reduce latency. Therefore processor 101 does not pay as big a time penalty by going all the way out to main memory 102 to retrieve lines of data and hence runs closer to overall processing speed.

As the prefetch system is enabled, 'y' lines of data can be moved from main memory 102 at time $t_{m3}$ into L3 cache 205, 'x' lines of data can be moved from L3 cache 205 at time $t_{32}$ into L2 cache 118, and 'w' lines of data can be moved from L2 cache 118 at time $t_{21}$ into L1 cache 112. In an example embodiment of this staging, a request may be made up to fifty cycles ahead to bring specific lines of data that will be needed by processor 101 to L2 cache 118.

As processor 101 gets closer to requiring some portion of the specific lines of data now residing in L2 cache 118, another request may be made, for example 20 cycles ahead, to instruct L2 cache 118 to send the portion of the specific lines of data into L1 cache 112. In this situation, processor 101 would be able to access the specific required line of data quickly from L1 cache 112, which may for example be just a couple of cycles away at time $t_1$ as opposed to directly accessing the specific required line of data from main memory 102, which could be hundreds of cycles away at time $t_4$.

Staging should be executed so lines of data are not moved to lower levels of memory to quickly. In an example embodiment, remember that L1 cache 112 can hold only integer w lines of data, which is less than integer x lines of data that L2 cache 118 can hold. If a line of data is moved to L1 cache 112 many cycles before that line of data is needed by processor 101, that line of data may get displaced by other lines of data as the prefetching process continues. When the processor 101 finally needs that displaced line of data, processor 101 may have to go to another level of cache, or even all the way to main memory 102, to retrieve the displaced line of data, which is hundreds of cycles away at time $t_4$. Such a data displacement from L1 cache 112 would slow the overall processing speed of processor 101 thus reducing performance.

Processor 101 has the capability of detecting and prefetching frequently used lines of data, i.e., streams. Store streams and load streams may be handled separately. Store streams are analogous to load streams but are defined by a sequence of store instructions rather than load instructions.

Processor 101 executes data prefetching a certain number of data lines 'n' in advance corresponding to that many cache lines ahead of when the processor 101 will need the data. An example of prefetching in a default power consumption mode in accordance with an aspect of the present invention will now be described with reference to FIGS. 4-6.

FIG. 4 illustrates an example first state 400 of L1 cache 112, L2 cache 118 and L3 cache 205 in an example default power consumption mode in accordance with an aspect of the present invention. As illustrated in the figure, in a first state 400, n+1 to n+18 lines of data are prefetched in L1 cache 112, L2 cache 118, and L3 cache 205. This is referred to as depth where as discussed previously 'y' lines of data can be moved from main memory 102 to L3 cache 205, where L3 cache has a depth of 'y' lines of data, L2 cache 118 has a depth of 'x' lines of data and L1 cache 112 has a depth of 'w' lines of data. In the exemplary embodiment shown in FIG. 4, L3 cache 205 has a depth of 12 lines of data n+7 through n+18, L2 cache 118 has a depth of 4 lines of data n+3 through n+6, and L1 cache 112 has a depth of 2 lines of data n+1 and n+2. In this example, lines of data n+1 and n+2 in L1 cache 112, were previously in L2 cache 118, whereas lines of data n+3 through n+6 in L2 cache 118 were previously in L3 cache 205.

Processor 101 cycles through states as it continues to stage lines of data into the different levels of memory via prefetching. As discussed previously, processor 101 requires a fixed value of time to retrieve lines of data from each of the levels of memory. FIG. 5 illustrates an example second state 500 of L1 cache 112, L2 cache 118 and L3 cache 205 in an example default power consumption mode in accordance with an aspect of the present invention. As illustrated in the figure, processor 101 is operable to access lines of data in L1 cache 112 in the fastest time $t_1$. Processor 101 executes data line n+1 in time $t_1$ and as staging continues, wherein lines of data n+2 and n+3 move up to L1 cache 112. Since access time from L2 cache 118 to L1 cache 112 requires time $t_{21}$, which is slower than time $t_1$ data lines n+4 through n+6 have not had sufficient time to be prefetched closer to cache L1 112 at this state. Therefore, in second state 500, a space 502 has been created in L2 cache 118.

FIG. 6 illustrates an example third state 600 of L1 cache 112, L2 cache 118 and L3 cache 205 in an example default power consumption mode in accordance with an aspect of the present invention. As processor 101 continues to third state 600, line of data n+2 has been executed and staging continues. L1 cache 112 is operable to access lines of data at time $t_1$ and lines of data n+3 and n+4 are staged to L1 cache 112. L2 cache 118 is operable to access lines of data at time $t_2$ slower than time $t_1$, but sufficient time has passed to stage lines of data n+5 through n+8 into the L2 cache. Since access time to L3 cache 205 requires time $t_3$, which is slower than time $t_1$ and time $t_2$, data lines n+9 through n+18 have not had sufficient time to be prefetched closer to L2 cache 118 at this state. Therefore, in third state 600, a space 602 and a space 604 has been created in L3 cache 205.

Processor 101 may continually perform prefetching at all levels of memory as discussed above in the default power consumption mode, such that multiple lines of data may be shifted from main memory 102, to L3 cache 205, to L2 cache 118 and then to L1 cache 112. Further, it should be noted that in some embodiments, lines of data are not moved from one level of cache to another level of cache. In some embodiments, lines of data are copied from one level of cache to another level of cache, such that the copied lines of data are present in at least two levels of cache and may be retrieved from any of such levels. For example, in some embodiments, after line of data n+1 is retrieved from L1 cache 112, L1 cache 112 is then filled with lines of data n+2 and n+3, such as illustrated in FIG. 5. Further, in this example, L2 cache 118 may remain the same, such as illustrated in FIG. 4, such that data line n+3 remains in L2 cache 118 while a copy of data line n+3 is in L1 cache 112.

Returning to FIG. 3, the above discussion is an example operation when processor 101 is operating in the default or maximum power consumption mode (S304). There is a power tradeoff when work is speculatively done (prefetching). More power is consumed when requests are made and lines of data are moved from further reaches of memory to closer regions of cache. There may be times when the processor 101 does not need to operate at maximum capacity as work loads may be low and therefore can work at lower power requirements. Referring to FIG. 3 processor 101 therefore determines power consumption requirements (S306).

Next, processor 101 determines if a new power consumption mode is required (S308). This determination may be made via a signal from a user, or automatically by an algorithm that monitors the workload on the processor.

In embodiments where an algorithm determines whether a new power consumption mode is required, the algorithm may monitor at least one workload characteristic, non-limiting examples of which include the number of data store requests into memory/cache, the number of data fetch requests from memory/cache, the number of data fetch misses from memory/cache, the number of data retrieval hits, etc, and any combination thereof. Further the algorithm may be operable to determine whether a new power consumption mode is required based the monitored workload characteristic(s), or changes thereof. For example, the algorithm may determine that a new power consumption mode is required when the monitored workload characteristic(s), or changes thereof, exceed a predetermined new power consumption mode threshold.

If the determination is "NO," then processor 101 continually monitors power consumption requirements (S306) until a new (lower) power consumption mode is required (S308).

Next, if the determination of step (S308) is "YES," then processor 101 determines whether a high power savings mode is required (S310). This determination may be made via a signal from a user, or automatically by an algorithm that monitors the workload on the processor.

In embodiments where an algorithm determines whether a high power savings mode is required, the algorithm may monitor at least one workload characteristic(s), non-limiting examples of which include the number of data store requests into memory/cache, the number of data fetch requests from memory/cache, the number of data fetch misses from memory/cache, the number of data retrieval hits, etc, and any combination thereof. Further the algorithm may be operable to determine whether a high power savings mode is required based the monitored workload characteristic(s), or changes thereof. For example, the algorithm may determine that a high power savings mode is required when the monitored workload characteristic(s), or changes thereof, exceed a predetermined high power savings mode threshold.

In one example embodiment, an algorithm may monitor at least one workload characteristic(s) that is(are) different than the characteristic that is monitored to determine whether a new power consumption mode is required, as discussed above with reference to step S308. In such cases, the predetermined new power consumption mode threshold may be unrelated to the predetermined high power savings mode threshold.

In another example embodiment, an algorithm may monitor at least one workload characteristic(s) that is the same as the characteristic that is monitored to determine whether a new power consumption mode is required as discussed above with reference to step S308, and will determine that a high power savings mode is required when the monitored characteristic(s) exceeds the predetermined high power savings mode threshold. In such cases, the predetermined high power savings mode threshold may be related to, e.g., higher than or lower than, the predetermined new power consumption mode threshold.

If the determination in step S310 is "YES" then processor 101 operates in a high power savings mode (S312).

In an example high power savings mode, data prefetching is fully disabled, wherein all staging, for example as discussed above with respect to FIGS. 4 through 6, are disabled and processor 101 receives lines of data directly from main memory 102 at time $t_4$. Therefore in this mode the power trade off is a maximum amount of power is saved but processor 101 runs at the slowest speed due to the latency.

Next, if the determination of step (S310) is "NO" then processor 101 determines if a medium power savings mode is required (S314). This determination may be made via a signal from a user, or automatically by an algorithm that monitors the workload on the processor.

In embodiments where an algorithm determines whether a medium power savings mode is required, the algorithm may monitor at least one workload characteristic(s), non-limiting examples of which include the number of data store requests into memory/cache, the number of data fetch requests from memory/cache, the number of data fetch misses from memory/cache, the number of data retrieval hits, etc, and any combination thereof. Further the algorithm may be operable to determine whether a medium power savings mode is required based the monitored workload characteristic(s), or changes thereof. For example, the algorithm may determine that a medium power savings mode is required when the monitored workload characteristic(s), or changes thereof, exceeds a medium power savings mode threshold.

In one example embodiment, an algorithm may monitor at least one workload characteristic(s) that is(are) different than the characteristic(s) that is(are) monitored to determine whether a new power consumption mode is required as discussed above with reference to step S308. In such cases, the predetermined medium power savings mode threshold may be unrelated to the predetermined new power consumption mode threshold.

In another example embodiment, an algorithm may monitor at least one workload characteristic(s) that is(are) different than the characteristic(s) that is(are) monitored to determine whether a high power consumption mode is required as discussed above with reference to step S310. In such cases, the predetermined medium power savings mode threshold may be unrelated to the predetermined high power consumption mode threshold.

In another example embodiment, an algorithm may monitor at least one workload characteristic(s) that is(are) the same as the characteristic(s) that is(are) monitored to determine whether a new power consumption mode is required as discussed above with reference to step S308, and will determine whether a medium power savings mode is required when the monitored characteristic(s) exceeds a predetermined threshold. In such cases, the predetermined medium power consumption mode threshold may be related to, e.g., higher than or lower than, the predetermined new power consumption mode threshold.

In another example embodiment, an algorithm may monitor at least one workload characteristic(s) that is(are) the same as the characteristic(s) that is(are) monitored to determine whether a high power consumption mode is required as discussed above with reference to step S310, and will determine whether a medium power savings mode is required when the monitored characteristic(s) exceeds a predetermined threshold. In such cases, the predetermined medium power consumption mode threshold may be related to, e.g., higher than or lower than, the predetermined high power consumption mode threshold.

If the determination in step S314 is "YES" then processor 101 operates in a medium power savings mode (S316).

In an example medium power savings mode (S316), the processing system less power than the default power consumption mode (S304), but uses more power than it would in a high power savings mode (S312). Further, in the example medium power savings mode (S316), the processing system processes slower than the default power consumption mode (S304), but processes faster than it would in a high power savings mode (S312).

An example of prefetching in a medium power savings mode in accordance with an aspect of the present invention will now be described with reference to FIGS. 7-9. FIG. 7 illustrates an example first state 700 of L2 cache 118 and L3 cache 205 in an example medium power savings mode in accordance with an aspect of the present invention. FIG. 8 illustrates an example second state 800 of L2 cache 118 and L3 cache 205 in an example medium power savings mode in accordance with an aspect of the present invention. FIG. 9 illustrates an example third state 900 of L2 cache 118 and L3 cache 205 in an example medium power savings mode in accordance with an aspect of the present invention.

In an example embodiment, to reduce power in an example medium power savings mode, L3 cache 205 is reduced to a max depth of 'a' lines of data ahead. As discussed earlier the prefetch system can retrieve and store 'y' lines of data from main memory 102 to the L3 cache 205. In the exemplary embodiment illustrated in FIG. 4, L3 cache 205 is shown with a depth of 12 lines of data n+7 through n+18 retrieved and stored from main memory 102. However, in the medium power savings mode, 'y' lines of data is reduced to 'a' lines of data where a<y. In an exemplary embodiment, with reference to FIGS. 7-9, L3 cache 205 is shown with a max depth of 8 lines of data. For example, in FIG. 7, L3 cache 205 has staged a lines of data n+5 through n+12, where a=8.

To further reduce power in an example medium power savings mode, L1 cache 112 prefetching is completely disabled. As discussed earlier, when processor 101 is operating in the default power consumption mode (S304) the prefetch system can retrieve and store 'w' lines of data that can be moved from, L2 cache 118 into L1 cache 112. As compared to an example default power consumption mode as discussed with respect to FIG. 4, which shows a depth of 2 lines of data n+1 and n+2 stored in L1 cache 112, in an exemplary embodiment of a processing system operating in an example medium power savings mode, L1 cache 112 is disabled and no lines of data are stored therein.

Further, when operating in an example medium power savings mode, L2 cache 118 continues to stage 'x' lines of data, which in this example is 4 lines of data.

Because L1 prefetching is disabled in an example medium power savings mode, processor 101 retrieves executable lines of data directly from L2 cache 118, which expends the larger amount of time $t_2$. As discussed previously, processor 101 cycles through states as it continues to stage lines of data into the different levels of memory via prefetching. However, in the example medium power saving mode, L1 cache 112 is unavailable. As shown in FIG. 7, processor 101 is operable to access lines of data in L2 cache 118 in time $t_2$, which is the fastest access time in the example medium power savings mode.

With reference to FIG. 8, in second state 800, data line n+1 has been retrieved by processor 101. The time $t_{32}$ to retrieve a line of data from L3 cache 205 and store the line of data to L2 cache 205 is much larger than time $t_2$. Accordingly, in second state 800, L2 cache 118 has not had sufficient time to retrieve data line n+5 from L3 cache 205 because time $t_{32}$ is greater than time $t_2$. Therefore, in second state 800, a space 802 has been created in L2 cache 118.

As processor 101 continues to third state 900 as illustrated in FIG. 9, processor 101 has retrieved line of data n+2 from L2 cache 118 and staging continues. Lines of data n+5 and n+6 are staged to L2 cache 118 from L3 cache 205. As illustrated in third state 900, the time $t_{32}$ to retrieve a line of data from L3 cache 205 and store the line of data to L2 cache 118 is much smaller than time $t_{m3}$, the time to retrieve a line of data from main memory 102 and store the line of data to L3 cache 205. Accordingly, in third state 900, L3 cache 205 has not had sufficient time to retrieve data lines n+13 and n+14 from main memory 102 because time $t_{m3}$ is greater than time $t_{32}$. Therefore, in third state 900, a space 902 and a space 904 has been created in L3 cache 205.

Processor 101 may continually perform prefetching at the levels of memory as discussed above in the medium power savings mode, such that multiple lines of data may be shifted from main memory 102, to L3 cache 205 and then to L2 cache 118.

To still further reduce power in an example medium power savings mode, store prefetching is disabled. As discussed previously, processor 101 may separately address storing lines of data because other devices may be using these lines of data in a multi-processor system. There is a performance benefit to prefetching lines that will likely have data stored therein at a later time, such as with a storing instruction. However prefetching lines of data in anticipation of a storing instruction well before such lines of data are actually needed does not provide as much benefit as prefetching these lines of data for loading data as has been discussed thus far in reference to FIGS. 4-9. Since there is a performance benefit for store prefetching there is also power savings by disabling it.

Returning to FIG. 3, if the determination of step (S314) is "NO" then processor 101 determines if a low power savings mode is required (S318). This determination may be made via a signal from a user, or automatically by an algorithm that monitors the workload on the processor.

In embodiments where an algorithm determines whether a low power savings mode is required, the algorithm may monitor at least one workload characteristic(s), non-limiting examples of which include the number of data store requests into memory/cache, the number of data fetch requests from memory/cache, the number of data fetch misses from memory/cache, the number of data retrieval hits, etc, and any combination thereof. Further the algorithm may be operable to determine whether a low power savings mode is required based the monitored workload characteristic(s), or changes thereof. For example, the algorithm may determine that a low power savings mode is required when the monitored workload characteristic(s), or changes thereof, exceeds a low power savings mode threshold.

In one example embodiment, an algorithm may monitor at least one workload characteristic(s) that is(are) different than the characteristic(s) that is(are) monitored to determine whether a new power consumption mode is required as discussed above with reference to step S308. In such cases, the predetermined low power savings mode threshold may be unrelated to the predetermined new power consumption mode threshold.

In another example embodiment, an algorithm may monitor at least one workload characteristic(s) that is(are) different than the characteristic(s) that is(are) monitored to determine whether a high power consumption mode is required as discussed above with reference to step S310. In such cases, the predetermined low power savings mode threshold may be unrelated to the predetermined high power consumption mode threshold.

In another example embodiment, an algorithm may monitor at least one workload characteristic(s) that is(are) different than the characteristic(s) that is(are) monitored to determine whether a medium power consumption mode is required as discussed above with reference to step S314. In such cases, the predetermined low power savings mode threshold may be unrelated to the predetermined medium power consumption mode threshold.

In another example embodiment, an algorithm may monitor at least one workload characteristic(s) that is(are) the same as the characteristic(s) that is(are) monitored to determine whether a new power consumption mode is required as discussed above with reference to step S308, and will determine whether a low power savings mode is required when the monitored characteristic(s) exceeds a predetermined threshold. In such cases, the predetermined low power consumption mode threshold may be related to, e.g., higher than or lower than, the predetermined new power consumption mode threshold.

In another example embodiment, an algorithm may monitor at least one workload characteristic(s) that is(are) the same as the characteristic(s) that is(are) monitored to determine whether a high power consumption mode is required as discussed above with reference to step S310, and will determine whether a low power savings mode is required when the monitored characteristic(s) exceeds a predetermined threshold. In such cases, the predetermined low power consumption mode threshold may be related to, e.g., higher than or lower than, the predetermined high power consumption mode threshold.

In another example embodiment, an algorithm may monitor at least one workload characteristic(s) that is(are) the same as the characteristic(s) that is(are) monitored to determine whether a medium power consumption mode is required as discussed above with reference to step S314, and will determine whether a low power savings mode is required when the monitored characteristic(s) exceeds a predetermined threshold. In such cases, the predetermined low power consumption mode threshold may be related to, e.g., higher than or lower than, the predetermined medium power consumption mode threshold.

If it is determined that a low power savings mode is required, then processor 101 operates in the low power savings mode (S320).

In an example low power savings mode (S320), the processing system consumes more power than the medium power savings mode (S316), but uses less power than it would in the default power consumption mode (S304). Further, in the example low power savings mode (S320), the processing system processes slower than the default power consumption mode (S304), but processes faster than it would in a medium power savings mode (S316).

An example low power savings mode in accordance with an aspect of the present invention will now be described with reference to FIGS. 10-12, which illustrate a first state 1000, a second state 1100 and a third state 1200, respectively, of caches L1, L2 and L3.

An example low power savings mode (S320) may be similar to an example medium power savings mode (S316) in two respects. First, L3 cache 205 is reduced to a max depth of 'a' lines of data ahead. In an exemplary embodiment, for example as illustrated in FIG. 10, L3 cache 205 to have a max depth of 8 lines of data ahead, where a=8. Second, store prefetching is disabled.

However an example low power savings mode (S320) may be different from an example medium power savings mode (S316) in that L1 cache 112 is reduced to a max depth of 'b' lines of data as opposed to disabling L1 prefetches completely. As discussed earlier, 'w' lines of data may be retrieved and stored in L1 cache 112 from L2 cache 118 in the default power consumption mode (S320). In an example low power savings mode, the number of lines of data that can be retrieved and stored in L1 cache 112 is reduced to 'b' lines of data, where b<w. In an exemplary embodiment, for example as illustrated in FIG. 10, L1 cache 112 includes one line of data, n+1, which has been retrieved from L2 cache 118.

As discussed previously, processor 101 cycles L1 cache 112, L2 cache 118 and L3 cache 205 through states via prefetching. FIG. 10 illustrates an example first state 1000 of L1 cache 112, L2 cache 118 and L3 cache 205 in an example low power savings mode in accordance with an aspect of the present invention. FIG. 11 illustrates an example second state 1100 of L1 cache 112, L2 cache 118 and L3 cache 205 in an example low power savings mode in accordance with an aspect of the present invention. FIG. 12 illustrates an example third state 1200 of L1 cache 112, L2 cache 118 and L3 cache 205 in an example low power savings mode in accordance with an aspect of the present invention.

As discussed previously, processor 101 requires a fixed amount of time to retrieve lines of data from each of the levels of memory. As shown in FIG. 10, processor 101 is operable to access lines of data in L1 cache 112 in the fastest time $t_1$. Processor 101 executes data line n+1 in time $t_1$. As shown in FIG. 11, the time $t_{21}$ to retrieve a line of data from L2 cache 118 and store the line of data to L1 cache 112 is much smaller than time $t_1$. Accordingly, in second state 1100, L1 cache 112 has not had sufficient time to retrieve data line n+2 from L2 cache 118 because time $t_{21}$ is greater than time $t_1$. Therefore, in second state 1100, a space 1102 has been created in L1 cache 112. As shown in FIG. 12, the time $t_{32}$ to retrieve a line of data from L3 cache 205 and store the line of data to L2 cache 118 is much smaller than time $t_{21}$. Accordingly, in third state 1200, although L1 cache 112 has had sufficient time to retrieve data line n+2 from L2 cache 118, L2 cache 118 has not had sufficient time to retrieve data line n+6 from L3 cache 205 because time $t_{32}$ is greater than time $t_{21}$. Therefore, in third state 1200, a space 1202 has been created in L2 cache 112.

Processor 101 may continually perform prefetching at the levels of memory as discussed above in the low power savings mode, such that multiple lines of data may be shifted from main memory 102 to L3 cache 205, then to L2 cache 118 and then to L1 cache 112.

Returning back to FIG. 3, if the determination of step (S318) is "NO" then processor 101 returns to operating at the default power consumption mode (S304) and hence the maximum prefetching mode illustrated in FIGS. 4-6. The process then repeats again. When the processor 101 is operating in the high power savings mode (S312), the medium power savings mode (S316) or the low power savings mode (S320), the processor 101 continually monitors the system power requirements to determine if a new power consumption mode is required (S308).

The invention of adaptive data prefetch for maximum power efficiency has been established by explaining that stages of power, for example as illustrated in FIG. 3, S312, S316 and S320, can be saved by reducing speculative work in the form of data and store prefetching and max depth alteration as different combinations of tasks explained above.

The above discussed example embodiments of processor systems may operate in four distinct power utilization modes: a default power consumption mode, a high power savings mode, a medium power savings mode and a low power savings mode. Other embodiments of processor systems in accordance with the present invention may include a different number of distinct power utilization modes.

In the above discussed example embodiments of processor systems, in the default power consumption mode, prefetching is fully enabled. In other embodiments, the default power consumption mode may modify the amount of prefetching to the L1 cache, L2 cache or L3 cache, and may additionally disable store prefetching.

In the above discussed example embodiments of processor systems, in the high power savings mode, all prefetching is disabled. In other embodiments, the high power savings mode may modify the amount of prefetching such that at least one of the prefetching to the L1 cache, L2 cache or L3 cache are disabled.

In the above discussed example embodiments of processor systems, in the medium power savings mode, the L1 cache prefetching is disabled, the number of lines for the L3 cache prefetching is reduced, the stride detection is disabled and the store prefetching is disabled. In some embodiments, in the medium power savings mode, the L1 cache prefetching is not disabled. In some embodiments, in the medium power savings mode, the number of lines for the L3 cache prefetching is not reduced. In some embodiments, in the medium power savings mode, the stride detection is not disabled. In some embodiments, in the medium power savings mode, the store prefetching is not disabled.

In the above discussed example embodiments of processor systems, in the low power savings mode, the number of lines for the L1 cache prefetching is reduced, the number of lines for the L3 cache prefetching is reduced and the store prefetching is disabled. In some embodiments, in the low power savings mode, the number of lines for the L1 cache prefetching is not reduced. In some embodiments, in the low power savings mode, the number of lines for the L3 cache prefetching is not reduced. In some embodiments, in the low power savings mode, the stride detection is disabled. In some embodiments, in the low power savings mode, the store prefetching is not disabled.

In the above discussed example embodiments of processor systems, the L1 cache is operable to retrieve data from the L2 cache. In some embodiments, the L1 cache is operable to retrieve data from any of the L2 cache, the L3 cache or the memory.

In the above discussed example embodiments of processor systems, the L2 cache is operable to retrieve data from the L3 cache. In some embodiments, the L2 cache is operable to retrieve data from either of the L3 cache or the memory.

The above discussed example embodiments of processor systems include an L1 cache, an L2 cache and an L3 cache. Some embodiments of processor systems in accordance with an aspect of the present invention have more than three levels of cache. Some embodiments of processor systems in accordance with an aspect of the present invention have n levels of cache, wherein each level of cache is larger in size, i.e., can store more lines of data, than the previous level of cache. Further the access time to retrieve data from each level of cache to the processor portion is larger than the access time to retrieve data from the previous level of cache to the processor portion.

For the sake of explanation, presume that a first level cache is operable to store an integer w lines of data, for example two lines of data. Further, presume that each of the additional 1:n levels of cache is operable to store integer $x_{0:n}$ lines of data, respectively. Still further, presume that the memory is operable to store an integer z lines of data, wherein $w < x_1 \ldots < x_{n-1} < x_n < z$. In other words, the first level cache is operable to store the least amount of data lines, the memory is operable to store the largest amount of data lines and the levels of cache between the first level cache and the memory are operable to store increasing amounts of data lines. Similarly, presume that the processor is operable to access a line of data in the first level cache within a time $t_f$, to access a line of data in each of the additional 1:n levels of cache within time $t_{0:n}$, respectively, and to access a line of data in the memory within a time $t_m$, wherein $t_f < t_0 < t_1 < \ldots < t_{n-1} < t_n < t_m$. In other words, the processor is operable to access a line of data in the first level cache within the least amount of time, the processor is operable to access a line of data in the memory within the largest amount of time and the processor is operable to access a line of data in the levels of cache between the first level cache and the memory within increasing amounts of time.

In processor systems in accordance with an aspect of the present invention that have n levels of cache as discussed above, the prefetch system may be operable to retrieve up to $y_n$ lines of data from the memory and to store the up to $y_n$ lines of data in one of the 0:n level caches. The size of $y_n$ may depend on which cache level the lines of data are to be stored. For example, in a one-hundred level cache system, if the one-hundredth level cache is operable to store 1024 lines of data and the prefetch system is operable to move data from the memory to the one-hundredth level cache, then $y_n$ may be limited to 1024 lines of data. Similarly in the one-hundred level cache system, if the ninety-ninth level cache is operable to store 512 lines of data and the prefetch system is operable to move data from the memory to the ninety-ninth level cache, then $y_n$ may be limited to 512 lines of data.

In processor systems in accordance with an aspect of the present invention that have n levels of cache as discussed above, the prefetch system may be operable to retrieve up to $y_f$ lines of data from one of the memory and the 0:n levels of cache and to store the up to $y_f$ lines of data in the first level cache. In other words, lines of data may be retrieved, from the memory or any level of cache, to the first level of cache.

In processor systems in accordance with an aspect of the present invention that have n levels of cache as discussed above, one of the memory and the 0:n levels of cache and to store the lines of data in a lower level cache. In other words, lines of data may skip down levels of cache. For example, in a one-hundred level cache system, the prefetch system may be operable to retrieve lines of data from the one-hundredth level cache to the fifty-first level cache, without first storing such lines of data in intermediate levels of cache.

Some embodiments of processor systems in accordance with an aspect of the present invention have less than three levels of cache. Some embodiments of processor systems in accordance with an aspect of the present invention have a single level of cache.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A method of operating a data processing system having a processor, a unit that includes a first level cache and additional n levels of cache, a prefetch system and a memory, n being an integer greater than or equal to 0, the unit being operable to store lines of data in the first level cache, the first level cache being operable to store an integer w lines of data, the memory being operable to store an integer z lines of data, the unit being operable to store lines of data in the additional n levels of cache, each of additional 1:n levels of cache being operable to store integer $x_{1:n}$ lines of data, respectively, $w<x_1<\ldots<x_{x-1}<x_n<z$, the processor being operable to access a line of data in the first level cache within a time $t_f$, the processor being operable to access a line of data in each of the additional 1:n levels of cache within time $t_{1:n}$, respectively, $t_0<t_1<\ldots<t_{n-1}<t_n$, the processor being operable to access a line of data in the memory within a time $t_m$, $t_f<t_1<\ldots<t_{n-1}<t_n<t_m$, the prefetch system being operable to retrieve up to $y_n$ lines of data from the memory and to store the up to $y_n$ lines of data in the n level cache, the prefetch system being operable to retrieve up to $y_f$ lines of data from one of the memory and 1:n levels of cache and to store the up to $y_f$ lines of data in the first level cache, said method comprising:
   running the data processing system in a first mode;
   determining whether a second mode is required; and
   running the data processing system in the second mode,
   wherein in the first mode, the prefetch system is enabled to:
      retrieve $y_f$ lines of data from one of the memory and the 1:n level caches and to store the $y_f$ lines of data in the first level cache,
      retrieve $y_n$ lines of data from the memory and store the $y_n$ lines of data in the n level cache, and
      enable store prefetching via stream filtering,
   wherein the second mode is at least one of a low-power mode or a medium-power mode,
      wherein in the low-power mode the prefetch system is enabled to:
         retrieve b lines of data from one of the memory and the 1:n level caches and store the b lines of data in the first level cache, wherein $b<y_f$,
         retrieve a lines of data from the memory and store the a lines of data in the n level cache, wherein $a<y_n$, and
         disable store prefetching via stream filtering thereby reducing power consumption by the data processing system, and
      wherein in the medium-power mode the prefetch system is enabled to:
         disable prefetching into the first level cache,
         retrieve the a lines of data from the memory and store the a lines of data in the n level cache, wherein $a<y_n$, and
         disable store prefetching via stream filtering thereby reducing power consumption by the data processing system.

2. The method of claim 1, wherein said determining whether a second mode is required comprises monitoring a workload characteristic of the data processing system.

3. The method of claim 2, wherein said monitoring a workload characteristic of the data processing system comprises monitoring at least one of a number of data store requests into the memory, a number of data store requests into the unit, a number of data fetch misses from the memory, a number of data fetch misses from the unit, a number of data retrieval hits from the memory, a number of data retrieval hits from the unit and combinations thereof.

4. The method of claim 1, wherein said running the data processing system in the second mode comprises running the data processing system in a high power-saving mode by disabling the prefetch system from retrieving any lines of data from one of the memory and the 1:n level caches and from storing any lines of data in the first level cache, disabling the prefetch system from retrieving any lines of data from the memory and from storing any lines of data in the n level cache, and disabling store prefetching via stream filtering thereby reducing power consumption by the data processing system.

5. A data processing system program product for executing instructions in a data processing system, the data processing system program product comprising a data processing system-readable storage medium having data processing system-readable program code embodied in the medium, the data processing system having a processor, a unit that includes a first level cache and additional n levels of cache, a prefetch system and a memory, n being an integer greater than or equal to 0, the unit being operable to store lines of data in the first level cache, the first level cache being operable to store an integer w lines of data, the memory being operable to store an integer z lines of data, the unit being operable to store lines of data in the additional n levels of cache, each of the additional 1:n levels of cache being operable to store integer $x_{1:n}$ lines of data, respectively, $w<x_1<\ldots<x_{n-1}<x_n<z$, the processor being operable to access a line of data in the first level cache within a time $t_f$, the processor being operable to access a line of data in each of the additional 1:n levels of cache within time $t_{1:n}$, respectively, $t_1<\ldots<t_{n-1}<t_n$, the processor being operable to access a line of data in the memory within a time $t_m$, $t_f<t_1<\ldots<t_{n-1}<t_n<t_m$, the prefetch system being operable to retrieve up to $y_n$ lines of data from the memory and to store the up to $y_n$ lines of data in the n level cache, the prefetch system being operable to retrieve up to $y_f$ lines of data from one of the memory and 1:n levels of cache and to store the up to $y_f$ lines of data in the first level cache, the data processing system-readable program code being operable to instruct the data processing system to perform a method comprising:
   running the data processing system in a first mode;
   determining whether a second mode is required; and
   running the data processing system in the second mode when the second mode is required,
   wherein in the first mode, the prefetch system is enabled to:
      retrieve $y_f$ lines of data from one of the memory and the 1:n level caches and to store the $y_f$ lines of data in the first level cache,
      retrieve $y_n$ lines of data from the memory and store the $y_n$ lines of in the n level cache, and
      enable store prefetching via stream filtering,
   wherein the second mode is at least one of a low-power mode or a medium-power mode, wherein in the low-power mode the prefetch system is enabled to:
retrieve b lines of data from one of the memory and the 1:n level caches and store the b lines of data in the first level cache, wherein b<$y_f$,
retrieve a lines of data from the memory and store the a lines of data in the n level cache, wherein a<$y_n$, and
disable store prefetching via stream filtering thereby reducing power consumption by the data processing system, and
wherein in the medium-power mode the prefetch system is enabled to:
disable prefetching into the first level cache,
retrieve the a lines of data from the memory and store the a lines of data in the n level cache, wherein a<$y_n$, and
disable store prefetching via stream filtering thereby reducing power consumption by the data processing system.

6. The data processing system program product for executing instructions in a data processing system of claim 5, wherein said determining whether a second mode is required comprises monitoring a workload characteristic of the data processing system.

7. The data processing system program product for executing instructions in a data processing system of claim 6, wherein said monitoring a workload characteristic of the data processing system comprises monitoring at least one of a number of data store requests into the memory, a number of data store requests into the unit, a number of data fetch misses from the memory, a number of data fetch misses from the unit, a number of data retrieval hits from the memory, a number of data retrieval hits from the unit and combinations thereof.

8. The data processing system program product for executing instructions in a data processing system of claim 5, wherein said running the data processing system in the second mode comprises running the data proceeding system in a high power-saving mode by disabling the prefetch system from retrieving any lines of data from one of the memory and the 1:n level caches and from storing any lines of data in the first level cache, disabling the prefetch system from retrieving any lines of data from the memory and from storing any lines of data in the n level cache, and disabling store prefetching via stream filtering thereby reducing power consumption by the data processing system.

9. A data processing system comprising:
a processor;
a unit;
a first level cache within said unit;
a prefetch system;
n additional levels of cache; and
a memory,
wherein n is an integer greater than or equal to 0,
wherein said unit is operable to store lines of data in the first level cache,
wherein said first level cache is operable to store an integer w lines of data,
wherein each of said additional 1:n levels of cache is operable to store integer $x_{0:n}$ lines of data, respectively,
wherein said memory is operable to store an integer z lines of data,
wherein w<$x_1$< . . . <$x_{n-1}$<$x_n$<z,
wherein said processor is operable to access a line of data in said first level cache within a time $t_f$, to access a line of data in each of said additional 1:n levels of cache within time $t_{1:n}$, respectively,
wherein $t_1$< . . . <$t_{n-1}$<$t_n$,
wherein said processor is further operable to access a line of data in said memory within a time $t_m$,
wherein $t_f$<$t_1$< . . . <$t_{n-1}$<$t_n$<$t_m$,
wherein said prefetch system is operable to retrieve up to $y_n$ lines of data from said memory and to store the up to $y_n$ lines of data in said n level cache,
wherein said prefetch system is further operable to retrieve up to $y_f$ lines of data from one of said memory and said 1:n levels of cache and to store the up to $y_f$ lines of data in said first level cache,
wherein said prefetch system is further operable to run in a first mode,
wherein said processor is further operable to determine whether a second mode is required,
wherein said prefetch system is further operable to run in the second mode when the second mode is required,
wherein in the first mode, said prefetch system is enabled to:
retrieve $y_f$ lines of data from one of the memory and the 1:n level caches and to store the $y_f$ lines of data in the first level cache,
retrieve $y_n$ lines of data from the memory and store the $y_n$ lines of data in the n level cache, and
enable store prefetching via stream filtering,
wherein said second mode is at least one of a low-power mode or a medium-power mode,
wherein in the low-power mode said prefetch system is enabled to:
retrieve b lines of data from one of the memory and the 1:n level caches and store the b lines of data in the first level cache, wherein b<$y_f$,
retrieve a lines of data from the memory and store the a lines of data in the n level cache, wherein a<$y_n$, and
disable store prefetching via stream filtering thereby reducing power consumption by the data processing system, and
wherein in the medium-power mode said prefetch system is enabled to:
disable prefetching into the first level cache,
retrieve the a lines of data from the memory and store the a lines of data in the n level cache, wherein a<$y_n$, and
disable store prefetching via stream filtering thereby reducing power consumption by the data processing system.

10. The data processing system of claim 9, wherein said processor is operable to determine whether a second mode is required by monitoring a workload characteristic of at least one of said processor, said unit, said first level cache, said prefetch system, said n additional levels of cache and said memory.

11. The data processing system of claim 10, wherein a workload characteristic of at least one of said processor, said unit, said first level cache, said prefetch system, said n additional levels of cache and said memory comprises at least one of a number of data store requests into said memory, a number of data store requests into said unit, a number of data fetch misses from said memory, a number of data fetch misses from said unit, a number of data retrieval hits from said memory, a number of data retrieval hits from said unit and combinations thereof.

12. The data processing system of claim 9, wherein said running the prefetch system in the second mode comprises running the prefetch system in a high power-saving mode by disabling the prefetch system from retrieving any lines of data from one of the memory and the 1:n level caches and from storing any lines of data in the first level cache, disabling the prefetch system from retrieving any lines of data from the memory and from storing any lines of data in the n level cache, and disabling store prefetching via stream filtering thereby reducing power consumption by the data processing system.

13. A processor for use with a unit, a first level cache within the unit, n additional levels of cache and a memory, n being an integer greater than or equal to 0, the unit being operable to store lines of data in the first level cache, the first level cache being operable to store an integer w lines of data, each of the additional 1:n levels of cache being operable to store integer $x_{0:n}$ lines of data, respectively, the memory being operable to store an integer z lines of data and $w < x_1 < \ldots < x_{n-1} < x_n < z$, said processor comprising:

a processor portion; and a prefetch portion;

wherein said processor portion is operable to access a line of data in the first level cache within a time $t_f$, to access a line of data in each of the additional 1:n levels of cache within time $t_{1:n}$, respectively, wherein $t_1 < \ldots t_{n-1} < t_n$, wherein said processor portion is further operable to access a line of data in the memory within a time $t_m$, wherein $t_f < t_1 < \ldots < t_{n-1} < t_n < t_m$, wherein said prefetch portion is operable to retrieve up to $y_n$ lines of data from the memory and to store the up to $y_n$ lines of data in the n level cache, wherein said prefetch portion is further operable to retrieve up to $y_f$ lines of data from one of the memory and the 1:n levels of cache and to store the up to $y_f$ lines of data in the first level cache, wherein said prefetch portion is further operable to run in a first mode, wherein said processor portion is further operable to determine whether a second mode is required, wherein said prefetch portion is further operable to run in the second mode when the second mode is required, wherein in the first mode, said prefetch portion is enabled to:

retrieve $y_f$ lines of data from one of the memory and the 1:n level caches and to store the $y_f$ lines of data in the first level cache, retrieve $y_n$ lines of data from the memory and store the $y_n$ lines of data in the n level cache, and enable store prefetching via stream filtering, wherein the second mode is at least one of a low-power mode or a medium-power mode, wherein in the low-power mode said prefetch portion is enabled to:

retrieve b lines of data from one of the memory and the 1:n level caches and store the b lines of data in the first level cache, wherein $b < y_f$, retrieve a lines of data from the memory and store the a lines of data in the n level cache, wherein $a < y_n$, and disable store prefetching via stream filtering thereby reducing power consumption by the data processing system, and wherein in the medium-power mode said prefetch portion is enabled to:

disable prefetching into the first level cache, retrieve the a lines of data from the memory and store the a lines of data in the n level cache, wherein $a < y_n$, and disable store prefetching via stream-filtering thereby reducing power consumption by the data processing system.

14. The processor of claim 13, wherein said processor portion is operable to determine whether the second mode is required by monitoring a workload characteristic of said processor portion, said unit, said first level cache, said prefetch portion, said n additional levels of cache and said memory.

15. The processor of claim 14, wherein a workload characteristic of at least one of said processor portion, said unit, said first level cache, said prefetch portion, said n additional levels of cache and said memory comprises at least one of a number of data store requests into said memory, a number of data store requests into said unit, a number of data fetch misses from said memory, a number of data fetch misses from said unit, a number of data retrieval hits from said memory, a number of data retrieval hits from said unit and combinations thereof.

16. The processor of claim 13, wherein said running the prefetch portion in the second mode comprises running the prefetch portion in a high power-saving mode by disabling the prefetch portion from retrieving any lines of data from one of the memory and the 1:n level caches and from storing any lines of data in the first level cache, disabling the prefetch system from retrieving any lines of data from the memory and from storing any lines of data in the n level cache, and disabling store prefetching via stream filtering thereby reducing power consumption by the data processing system.

* * * * *